US012120024B2

(12) United States Patent
Sum Wong et al.

(10) Patent No.: US 12,120,024 B2
(45) Date of Patent: Oct. 15, 2024

(54) VIRTUAL CARRIER NETWORK

(71) Applicant: Google LLC, Mountain View, CA (US)

(72) Inventors: Benedict Seng Sum Wong, Mountain View, CA (US); Nathan C. Harold, Seattle, WA (US)

(73) Assignee: Google LLC, Mountain View, CA (US)

(*) Notice: Subject to any disclaimer, the term of this patent is extended or adjusted under 35 U.S.C. 154(b) by 257 days.

(21) Appl. No.: 17/453,188

(22) Filed: Nov. 2, 2021

(65) Prior Publication Data

US 2022/0141130 A1 May 5, 2022

Related U.S. Application Data

(60) Provisional application No. 63/108,844, filed on Nov. 2, 2020.

(51) Int. Cl.
*H04L 45/586* (2022.01)
*G06F 9/455* (2018.01)
*H04L 12/46* (2006.01)

(52) U.S. Cl.
CPC ........ *H04L 45/586* (2013.01); *G06F 9/45558* (2013.01); *H04L 12/4633* (2013.01); *H04L 12/4641* (2013.01)

(58) Field of Classification Search
CPC ............... H04L 45/586; H04L 12/4633; H04L 12/4641; H04L 67/1021; G06F 9/45558; H04W 76/12; H04W 76/15
See application file for complete search history.

(56) References Cited

U.S. PATENT DOCUMENTS 9,137,740 B2 * 9/2015 Stanforth .............. H04W 48/14
9,686,238 B1 6/2017 Row, II
(Continued)

FOREIGN PATENT DOCUMENTS

CN 102474888 A 5/2012
CN 106301921 A 1/2017
(Continued)

OTHER PUBLICATIONS

SDN and virtualization-based LTE mobile network architectures: A comprehensive survey, Van-Giang Nguyen, Truong-Xuan Do and YoungHan Kim, Aug. 6, 2015.
(Continued)

*Primary Examiner* — Alex Skripnikov
(74) *Attorney, Agent, or Firm* — Oblon, McClelland, Maier & Neustadt, L.L.P.

(57) ABSTRACT

A method for a virtual network of a mobile device includes, for the mobile device executing a user application and simultaneously connected to a first wireless network and a second wireless network, selecting a remote server from a plurality of remote servers. The method also includes establishing the virtual network between the mobile device and the selected remote server. The virtual network includes at least one tunnel between the mobile device and the selected remote server over the first wireless network and the second wireless network. The method also includes transmitting data from the user application to the selected remote server over the virtual network. The data, when received by the selected remote server, causes the selected remote server to route the data to a destination server.

20 Claims, 7 Drawing Sheets

(56) References Cited

U.S. PATENT DOCUMENTS

| | | |
|---|---|---|
| 10,455,403 B2 | 10/2019 | Gundavelli et al. |
| 2012/0311107 A1* | 12/2012 | Van der Merwe ............................ H04L 12/4641 709/220 |
| 2013/0079057 A1* | 3/2013 | Bell ................... H04M 1/2757 455/556.1 |
| 2013/0288644 A1 | 10/2013 | Schroeder et al. |
| 2015/0063166 A1 | 3/2015 | Sif et al. |
| 2015/0067819 A1* | 3/2015 | Shribman ............. H04L 67/141 709/218 |
| 2015/0085664 A1* | 3/2015 | Sachdev ............ H04L 41/0893 370/236 |
| 2016/0261473 A1* | 9/2016 | Gupta ................... H04M 15/70 |
| 2016/0308907 A1* | 10/2016 | Le ........................ H04W 76/12 |
| 2017/0150470 A1* | 5/2017 | Kalapatapu ....... H04W 28/0226 |
| 2017/0257886 A1 | 9/2017 | Adjakple et al. |
| 2018/0184337 A1* | 6/2018 | Jin ..................... H04L 12/2863 |
| 2018/0255132 A1* | 9/2018 | Yasukawa ............... H04L 12/66 |
| 2019/0014024 A1* | 1/2019 | Koshy .................. H04L 45/245 |

FOREIGN PATENT DOCUMENTS

| | | | |
|---|---|---|---|
| CN | 107251005 A | 10/2017 | |
| WO | WO-2015131949 A1 * | 9/2015 | ......... H04L 63/0272 |
| WO | WO-2017022791 A1 * | 2/2017 | ............. H04L 12/66 |
| WO | WO-2019119130 A1 * | 6/2019 | ......... H04L 63/0245 |
| WO | 2021118562 A1 | 6/2021 | |
| WO | 2021118563 A1 | 6/2021 | |

OTHER PUBLICATIONS

International Search Report and Written Opinion for the related Application No. PCT/US2021/057669, 224 pages.

Chinese Office Action issued Aug. 9, 2024, in Chinese Patent Application No. 202180033684.3, filed Nov. 2, 2021, (with English Translation downloaded via Global Dossier).

* cited by examiner

VIRTUAL CARRIER NETWORK

CROSS REFERENCE TO RELATED APPLICATIONS

This U.S. patent application claims priority under 35 U.S.C. § 119(e) to U.S. Provisional Application 63/108,844, filed on Nov. 2, 2020. The disclosure of this prior application is considered part of the disclosure of this application and is hereby incorporated by reference in its entirety.

TECHNICAL FIELD

This disclosure relates to virtual carrier networks for a user device.

BACKGROUND

Mobile devices (e.g., smart phones) and other user devices typically offer a host of different wireless connection technologies (e.g., cellular, Wi-Fi, Bluetooth, etc.). In order to reduce the costs of mobile data, mobile network operators (MNOs) and mobile virtual network operators (MNVOs) are frequently mediating additional lower-cost networks (e.g., Wi-Fi networks) and off-loading customer mobile data off cellular connections (e.g., 4G, 5G, etc.) onto the lower-cost networks when possible. Modern mobile operating systems do not offer convenient mobility solutions or user experiences for multiple carrier networks.

SUMMARY

One aspect of the disclosure provides a virtual carrier network for a mobile device. The method includes, for the mobile device executing a user application and simultaneously connected to a first wireless network associated with a mobile virtual network operator (MVNO) and a second wireless network associated with the same MVNO, selecting, by data processing hardware, a remote server from a plurality of remote servers. Each remote server of the plurality of remote servers is associated with a geographical location. The method also includes establishing, by the data processing hardware, a virtual network between the mobile device and the selected remote server. The virtual network includes at least one tunnel between the mobile device and the selected remote server over the first wireless network and at least one tunnel between the mobile device and the selected remote server over the second wireless network. The method also includes transmitting, by the data processing hardware, data from the user application to the selected remote server over the virtual network via one of the at least one tunnel between the mobile device and the selected remote server over the first wireless network or via one of the at least one tunnel between the mobile device and the selected remote server over the second wireless network. The data when received by the selected remote server causes the selected remote server to route the data to a destination server.

Implementations of the disclosure may include one or more of the following optional features. In some implementations, the at least one tunnel between the mobile device and the selected remote server over the first wireless network includes a first tunnel supporting data of a first service and a second tunnel supporting data of a second service. The at least one tunnel between the mobile device and the selected remote server over the second wireless network may include a third tunnel supporting data of the first service and a fourth tunnel supporting data of the second service. In this implementation, transmitting data from the user application to the selected remote server over the virtual network includes selecting the first tunnel or the second tunnel between the mobile device and the selected remote server via the first wireless network or the third tunnel or the fourth tunnel between the mobile device and the selected remote server via the second wireless network based on the user application.

In some examples, the first service includes an Internet service and the second service includes a tethering service. Optionally, the method further includes, after transmitting the data from the user application to the selected remote server, connecting, by the data processing hardware, the mobile device to a third wireless network. The third wireless network includes a user Wireless Fidelity (Wi-Fi) network. In this example, the method also includes transmitting, by the data processing hardware, data from the user application to the destination server over the third wireless network.

Selecting the remote server from the plurality of remote servers may be based on the geographical location of each remote server of the plurality of remote servers. In some implementations, the method further includes, prior to selecting the remote server from the plurality of remote servers, selecting, by the data processing hardware, a preferred wireless network from the first wireless network or the second wireless network based on a network preference. Here, selecting the remote server from the plurality of remote servers is based on the selected preferred wireless network. In some examples, the method further includes, after selecting the preferred wireless network, selecting, by the data processing hardware, a second remote server from the plurality of remote servers based on the geographical location of each remote server of the plurality of remote servers. The method may also include establishing, by the data processing hardware, a second virtual network between the mobile device and the selected second remote server and transmitting, by the data processing hardware, data from the user application to the selected second remote server over the second virtual network. The data when received by the selected second remote server causes the selected second remote server to route the data to the destination server.

Optionally, the user application includes a virtual private network (VPN) application. The destination server may include a VPN server associated with the VPN application. In some implementations, the method further includes determining, by the data processing hardware, whether the first wireless network is associated with the same MVNO as the second wireless network. In some examples, the first wireless network includes a cellular network and the second wireless network includes a Wireless Fidelity (Wi-Fi) network.

Another aspect of the disclosure provides a system for establishing a virtual carrier network for a mobile device. The system includes data processing hardware of a mobile device and memory hardware in communication with the data processing hardware. The memory hardware stores instructions that when executed on the data processing hardware cause the data processing hardware to perform operations. The operations include, for the mobile device executing a user application and simultaneously connected to a first wireless network associated with a mobile virtual network operator (MVNO) and a second wireless network associated with the same MVNO, selecting a remote server from a plurality of remote servers. Each remote server of the plurality of remote servers is associated with a geographical location. The operations also include establishing a virtual network between the mobile device and the selected remote server. The virtual network includes at least one tunnel between the mobile device and the selected remote server over the first wireless network and at least one tunnel between the mobile device and the selected remote server over the second wireless network. The operations also include transmitting data from the user application to the selected remote server over the virtual network via one of the at least one tunnel between the mobile device and the selected remote server over the first wireless network or via one of the at least one tunnel between the mobile device and the selected remote server over the second wireless network. The data when received by the selected remote server causes the selected remote server to route the data to a destination server.

This aspect may include one or more of the following optional features. In some implementations, the at least one tunnel between the mobile device and the selected remote server over the first wireless network includes a first tunnel supporting data of a first service and a second tunnel supporting data of a second service. The at least one tunnel between the mobile device and the selected remote server over the second wireless network may include a third tunnel supporting data of the first service and a fourth tunnel supporting data of the second service. In this implementation, transmitting data from the user application to the selected remote server over the virtual network includes selecting the first tunnel or the second tunnel between the mobile device and the selected remote server via the first wireless network or the third tunnel or the fourth tunnel between the mobile device and the selected remote server via the second wireless network based on the user application.

In some examples, the first service includes an Internet service and the second service includes a tethering service. Optionally, the operations further include, after transmitting the data from the user application to the selected remote server, connecting the mobile device to a third wireless network. The third wireless network includes a user Wireless Fidelity (Wi-Fi) network. In this example, the operations also include transmitting data from the user application to the destination server over the third wireless network.

Selecting the remote server from the plurality of remote servers may be based on the geographical location of each remote server of the plurality of remote servers. In some implementations, the operations further include, prior to selecting the remote server from the plurality of remote servers, selecting a preferred wireless network from the first wireless network or the second wireless network based on a network preference. Here, selecting the remote server from the plurality of remote servers is based on the selected preferred wireless network. In some examples, the operations further include, after selecting the preferred wireless network, selecting a second remote server from the plurality of remote servers based on the geographical location of each remote server of the plurality of remote servers. The operations may also include establishing a second virtual network between the mobile device and the selected second remote server and transmitting data from the user application to the selected second remote server over the second virtual network. The data when received by the selected second remote server causes the selected second remote server to route the data to the destination server.

Optionally, the user application includes a virtual private network (VPN) application. The destination server may include a VPN server associated with the VPN application. In some implementations, the operations further include determining whether the first wireless network is associated with the same MVNO as the second wireless network. In some examples, the first wireless network includes a cellular network and the second wireless network includes a Wireless Fidelity (Wi-Fi) network.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Carriers, such as mobile network operators (MNOs) and mobile virtual network operators (MVNOs), are increasingly providing connectivity via multiple heterogeneous network types (e.g., cellular networks and Wi-Fi networks). Carriers may use opportunistic data offload to lessen data costs by shifting traffic to cheaper networks (e.g., from cellular to Wi-Fi). However, conventional mobile operating systems (OS) do not offer abstraction of the underlying networks which leads to poor user experience and/or drops in connectivity when the mobile device switches between networks.

Current techniques to solve this problem generally involve extending a virtual private network (VPN) across the multiple wireless networks to a remote VPN server. While this does offer some network abstraction for the user and the mobile device, it also suffers from several drawbacks. For example, the VPN aggregates traffic from all networks connected to the mobile device, including user-mediated networks (such as a home Wi-Fi network). Because data over the user-mediated network must now traverse the VPN service, this engenders privacy issues and generally requires, at least, consent from the user. Moreover, the VPN does not provide any mobility for multiple profiles on the user device or for different data services (e.g., tethering). That is, typically all profiles and all data services must use the same VPN. As yet another example, the VPN restricts the user from using their own VPN application. Furthermore, in many cases, VPNs are user-controllable, and therefore provide a leaky abstraction at best.

Implementations herein are directed toward a virtual carrier network manager that executes on a user device for establishing a virtual network (e.g., a virtual carrier network) between the user device and multiple wireless networks associated with a wireless network operator (e.g., a mobile virtual network operator (MVNO)). The virtual network includes a remote server selected from a plurality of remote servers to serve as a mobility anchor. The virtual network also includes one more tunnels between the user device and the selected remote server. Applications executing on the user device send and receive data via the one or more tunnels of the virtual network to the selected remote server which routes the data to a destination server.

Figure 1:
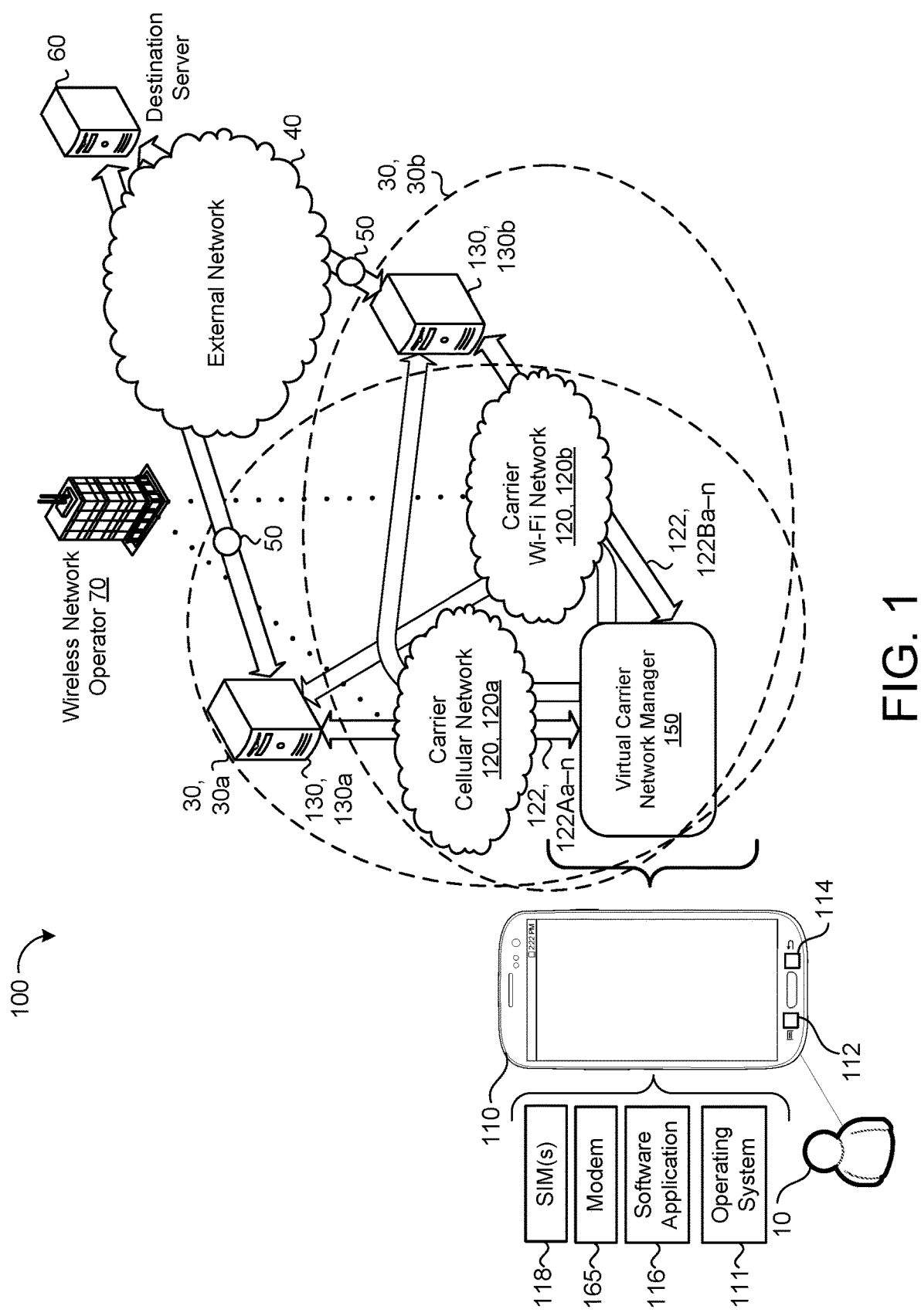
FIG. 1 is a schematic view of an example system for providing a virtual carrier network for a mobile device over two or more carrier wireless networks.

Referring now to FIG. 1, in some implementations, an example wireless communication environment (e.g., system) 100 includes a mobile device 110 (also referred to herein as a "user device") in communication with an external network 40 through at least two wireless networks 120, 120a-b simultaneously. For example, the user device 110 may communicate with the external network 40 via a carrier cellular network 120a and a carrier Wi-Fi network 120b. These wireless networks 120 are merely illustrative and the user device 110 may communicate with the external network 40 using any number of other types of wireless networks (e.g., Citizens Broadband Radio Service (CBRS), Bluetooth, etc.). The carrier cellular network 120a may include a General Packet Radio Service (GPRS) network, a Universal Mobile Telecommunications System (UMTS) network, a High Speed Packet Access (HSPA) network, an enhanced-HSPA (H+) network, an Enhanced Data Rates for Global System for Mobile communications (GSM) (EDGE) network, a Long-Term Evolution (LTE) radio access network (RAN) (e.g., 4G/5G LTE), or a 5G NR (New Radio) network that supports radio communication of data packets 50 (also referred to herein as just "data") and/or other services from the external network 40 to the user device 110 via, for example, base stations such as macro-cell evolved Node B's (MeNB). The Wi-Fi network 120b may include any version of Wi-Fi (e.g., 802.11n, 802.11ac, etc.) that also supports radio communication of the data packets 50. In some examples, the user device 110 connects to multiple wireless networks 120 of the same type simultaneously. For example, the user device 110 may include capabilities for simultaneously connecting to two separate carrier cellular networks 120a operated by different carriers 70 or multiple carrier Wi-Fi networks 120b with different access points.

The carrier cellular network 120a is associated with a mobile network operator (MNO) or a mobile virtual network operator (MNVO) that provides services of wireless communications to the subscribing user device 110 via the carrier cellular network 120a. The MNO or MVNO may also be referred to as a wireless service provider, wireless carrier, cellular company, mobile network operator, or mobile network carrier. The term "carrier" may be used herein to refer to the MNO or MVNO. The term "wireless network operator" may be used herein to refer to an entity that operates or mediates a wireless network 120, which may include a carrier (e.g., an MNO or MVNO) that operates/mediates a carrier-mediated wireless network 120 or a user 10 that operates/mediates a user-mediated wireless network 120.

As used herein, a carrier-mediated wireless network 120 (also referred to herein as just a "carrier wireless network 120") includes any wireless network 120 managed or mediated or controlled by a single particular carrier 70 (e.g., an MNO or MVNO) where the user device 110 subscribes to a service provided by the carrier. That is, the user 10 does not control or manage the wireless network 120. A carrier-mediated network 120 is a network for which a carrier has provided credentials, such as where either a carrier-provided SIM profile or a carrier-provided application which can be authenticated by the carrier-provided SIM profile, has provided credentials. For example, a SIM profile provided on a universal integrated circuit card (UICC) allows the user device 110 to attach and authenticate with a carrier cellular network 120a. Or, the carrier application is authenticated by the operating system (OS) 111 to access the SIM profile. The carrier application may be cryptographically signed with the carrier's private key and authenticated via the signature of the application contained in the SIM profile. The carrier application is authorized by the operating system 111 to provide credentials for accessing, for example, carrier Wi-Fi access points. In some examples, the authenticated carrier application may provide a WPA password or a Hotspot2.0 certificate; or, for an open network where credentials are not needed to connect to the access point, the carrier causes the user device 110 to connect to the access point without need for user intervention, or causes a suggestion to connect to the network to be made to the user, which the user can accept or reject. In the case of carrier-mediated connections to open wireless networks 120, an additional step may be needed to satisfy requirements of a "captive portal" to gain internet access, such as accepting terms and conditions, or supplying a passcode or other login information. For carrier-mediated connections to open-networks 120 with captive portals, the carrier may accept terms on the user's behalf or provide an email address, passcode or other login information in an automated fashion. An automated fashion may mean providing login information via protocols such as WISPr or via the automated submission of web forms. A single user device 110 can support multiple carrier-mediated wireless networks 120 simultaneously.

A user-mediated wireless network 120 includes any wireless network 120 associated with a wireless network operator (e.g., carrier) 70 that the user device 110 does not explicitly subscribe to such that the user-mediated wireless network 120 is ultimately managed or mediated or controlled by the user 10. A user-mediated network is a network for which the user has provided their own credentials, if necessary, to connect e.g., to an access point, e.g., a WPA password or a user-installed certificate, e.g., a Hotspot2.0 certificate; or, for an open network where credentials to connect to the access point are not needed, the user has taken an affirmative action to connect to the network, such as selecting the network from a list, or accepting a suggestion made by the operating system. Any selection may only occur the first time the device is exposed to the network. On user-mediated open networks, additional manual steps may be needed to satisfy requirements of a "captive portal" to gain internet access, such as accepting terms and conditions, or supplying an email address, a passcode or other login information.

A single device, e.g., an access point, can provide access to both a user-mediated network and a carrier-mediated network. The user who owns, rents or controls the AP can enable others to access the Internet using the access point, e.g., the user creates a WEP password that the user provides to others. The access point when accessed in that way provides access to a user-mediated network. The cable service provider or DSL service provider may operate a carrier-mediated network service from the same access point. Devices with a HS2.0 certificate provisioned by the carrier app will automatically connect to the same access point. No user intervention or password is required.

In an example where the user has a contract for Internet service provided by a wireless network operator 70 corresponding to an Internet Service Provider (ISP), and thus may select any one of a multitude of different wireless-enabled user devices 110 to connect to the Internet service at any given time, the wireless networks 120 (e.g., carrier Wi-Fi networks 120*b*) accessed by the selected user devices 110 to use the Internet service correspond to user-mediated wireless networks 120. Here, the user 10 may control a modem that connects to the Internet service, as well as a wireless access point (AP) (e.g., a wireless router) in communication with the modem to provide a local area network (LAN) that the selected user devices 110 may establish wireless connections with to use the Internet service. In other examples, a user-mediated wireless network 120 may simply include a Bluetooth connection (or other wireless connection) between the user device 110 and another device in proximity to the user device 110. On the other hand, when a particular user device 110 associated with the user 10 subscribes to services of wireless communications provided by a particular carrier 70 (e.g., an MNO or MVNO), the wireless networks 120 (e.g., cellular and/or carrier Wi-Fi networks 120*a*, 120*b*) accessed by the subscribing user device 110 to receive the services of wireless communications correspond to carrier-mediated wireless networks 120. In some implementations, a subscriber identity module (SIM) installed on the user device 110 includes a profile defined by a particular carrier 70 to enable and authenticate the user device 110 to connect to carrier-mediated wireless networks 120 associated with the particular carrier 70. If, however, the user 10 would like to connect other user devices 110 to these carrier-mediated wireless networks 120 associated with the particular carrier 70, each of these other user devices 110 must individually subscribe to the services of wireless communication provided by the particular carrier 70. In these implementations, the user device 110 may freely connect to user-mediated wireless networks 120 associated with one or more wireless network operators 70 other than the particular carrier 70. While the user device 110 is depicted as a mobile device 110 in the example shown, the user device 110 can include any device capable of connecting to wireless networks 120 such as, without limitation, a tablet, laptop, desktop, smart watch, smart speaker, smart display, smart appliance, etc.

The user device 110 includes computing resources 112 (e.g., data processing hardware) and/or storage resources 114 (e.g., memory hardware). The data processing hardware 112 executes an operating system 111 and one or more user software applications 116. The data processing hardware 112 further executes a virtual carrier network manager 150. In some implementations, the operating system 111 executes the functionality of the virtual carrier network manager 150.

The user device 110 may use a variety of different operating systems 111. In examples where a user device 110 is a mobile device, the user device 110 may run an operating system including, but not limited to, ANDROID® developed by Google Inc., IOS® developed by Apple Inc., or WINDOWS PHONE® developed by Microsoft Corporation. Accordingly, the operating system 111 running on the user device 110 may include, but is not limited to, one of ANDROID®, IOS®, or WINDOWS PHONE®. In some examples a user device may run an operating system including, but not limited to, MICROSOFT WINDOWS® by Microsoft Corporation, MAC OS® by Apple, Inc., or Linux.

The user device 110 further includes at least one modem 165 (also referred to as a baseband or baseband processor). The modem 165 includes one or more antennas that enable the user device to communicate with the operator wireless networks 120 wirelessly. The modem 165 may communicate with one or more radios operating on a variety of frequencies simultaneously (e.g., 700 MHz, 900 MHz, 2.4 GHz, 5.0 GHz etc.). The modem 165 may include various components to provide transmit and receive functions (a processor, memory, etc.). In some implementations, data processing hardware 112 includes the modem 165. That is, tasks executed by the data processing hardware 112, in some examples may instead be executed by the modem 165 and vice versa.

The user device 110 further includes one or more corresponding subscriber identification modules (SIM) 118 for identifying and connecting the user device 110 with certain types of carrier-mediated wireless networks 120. For instance, the SIM 118 may include a corresponding SIM profile with the credentials for authorizing the user device 110 to connect with the carrier cellular network 120*a* to access a destination server 60 over the external network 40. Similarly, the SIM 118 may include one or more additional SIM profiles with corresponding credentials for authorizing the user device 110 to connect with other carrier-mediated wireless networks 120 managed by wireless network operators 70 other than the network operator managing the carrier cellular network 120*a*. In some examples, the one or more SIMs 118 include any combination of one or more embedded SIMS (eSIM) and one or more physical SIMS.

The virtual carrier network manager 150 (also referred to herein as the "VCN manager 150") establishes a virtual network 30, 30*a-b* (also referred to herein as a "virtual carrier network" or "VCN") between the user device 110 and a remote server 130, 130*a-b*. As discussed in more detail below, the VCN manager 150 selects the remote server 130 from among a plurality of remote servers 130. Each remote server 130 may be associated with a geographical location. In some examples, the geographical locations are different. For example, a first remote server 130*a* is associated with a geographical location that is at or near a geographical location associated with a datacenter supporting the carrier cellular network 120*a*. That is, data packets 50 that traverse the carrier cellular network 120*a* are processed by one or more servers (not shown) associated with the carrier cellular network 120*a*. The first remote server 130*a* may be located geographically near (e.g., "co-sited" or "co-located") the one or more servers associated with the data center supporting the carrier cellular network 120*a*. Similarly, a second remote server 130*b* may be geographically located at or near a datacenter supporting the carrier Wi-Fi network 120*b*. In other examples, multiple remote servers 130 have the same geographical location. For example, a data center associated with a wireless network 120 includes multiple remote servers 130.

The VCN manager 150 establishes the virtual network 30 between the mobile device 110 and the selected remote server 130. For example, when the VCN manager 150 selects the first remote server 130*a*, the VCN manager 150 establishes a first virtual network 30, 30*a* between the mobile device 110 and the first remote server 130*a*. Alternatively, when the VCN manager 150 selects the second remote server 130*b*, the VCN manager 150 establishes a second virtual network 30, 30*b* between the mobile device 110 and the second remote server 130*b*. The virtual network 30 includes at least one tunnel 122, 122Aa-n between the mobile device 110 and the selected remote server 130 over a first wireless network 120 (e.g., the carrier cellular network 120*a*) and at least one tunnel 122, 122Ba-n between the mobile device 110 and the selected remote server 130 over a second wireless network 120*b* (e.g., the carrier Wi-Fi network 120*b*). Each tunnel 122 establishes private network communications over its respective wireless network 120 through encapsulation (e.g., using Internet Protocol Security (IPSec), etc.). Each tunnel 122 may independently establish secure communication between the user device 110 and the selected remote server 130, which may include performing key exchanges (e.g., via Internet Key Exchange (IKE)) and establishing encryption and other secure communication procedures. In some implementations, the VCN manager 150 uses an IKE library as a control plane and IPSec as a dataplane with configuration provided by one or more wireless network operators 70 (e.g., via the SIM(s) 118). Note that these protocols are exemplary only and the VCN manager 150 may implement any other protocols.

The user device 110 executes a user software application 116 that communicates with the destination server 60. For example, the user software application 116 includes an Internet browser, a gaming application, a messaging application, an email application, and/or any other application that communicates with other devices (e.g., the destination server 60) remote to the user device 110 via a wireless network 120. In some examples, the user software application 116 includes a user VPN application and the destination server 60 includes a VPN server associated with the VPN application. The VCN manager 150 transmits data packets 50 from the user software application 116 to the selected remote server 130 over the virtual network 30 via one of the tunnels 122 over one of the carrier wireless networks 120 connected to the user device 110. The selected remote server 130, when receiving the data packets 50, forwards the data packets 50 to the destination server 60 via the external network 40. Likewise, data packets 50 received by the selected remote server 130 from the destination server 60 (through the external network 40) are transmitted (via the tunnels 122) to the user device 110 and the user software application 116, thus establishing two-way communication between the user software application 16 and the destination server 60 via one or more of the wireless networks 120 and the external network 40.

The external network 40 may be independent from any network related with the user device 110 or the carrier 70 that operates the wireless networks 120. The destination server 60 may be any remote server that the user software application 116 executing on the user device 110 sends or receives data packets 50 to or from. For example, the destination server 60 may be a web server that hosts web content.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

Figure 2:
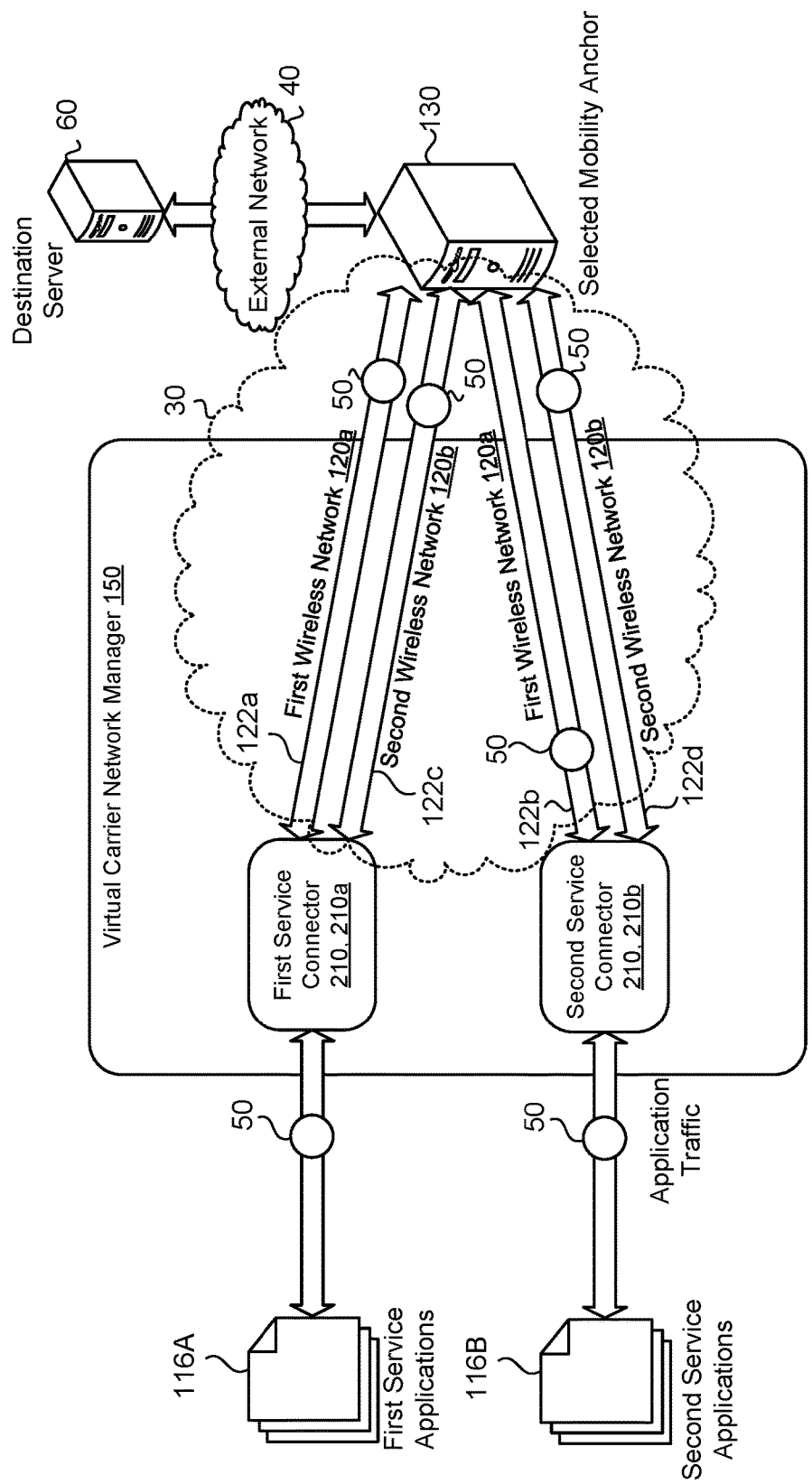
FIG. 2 is a schematic view of exemplary components of a virtual carrier network manager.

Referring now to FIG. 2, in some implementations, the user device 110 executes different user software applications (i.e., service applications) 116 for different services and/or capabilities. For example, the user device 110 executes first service applications 116, 116A that require or use a first service or capability. The first service applications 116A may include user applications such as browsers or email applications that require access to the Internet. The user device 110 may also execute second service applications 116, 116B that require or use a second service or capability. For example, the second service applications 116B include platform applications (e.g., OS application) such as tethering applications that tether the user device 110 to other nearby devices. The user device 110 may execute any combination of classes of service applications 116 (e.g., third service applications) that support or require further services or capabilities such as short message service (SMS), multimedia messaging services (MMS), rich communication services (RCS), assisted global positioning system (GPS), voice over Internet Protocol (VoIP), etc.

In some examples, the VCN manager 150 includes one or more service connectors 210, 210a-b that each interface with one or more types of service applications 116. For example, a first service connector 210a receives data packets 50 from first service applications 116A while a second service connector 210b receives data packets 50 from second service applications 116B. Each service connector 210 may establish a tunnel 122 between the user device 110 and the selected remote server 130 for each wireless network 120. In the example shown, the first service connector 210a establishes a first tunnel 122a between the user device 110 and the selected remote server 130 over the first wireless network 120a for data 50 received from the first service applications 116A. The second service connector 210b establishes a second tunnel 122b between the user device 110 and the selected remote server 130 (i.e., selected mobility anchor) over the first wireless network 120a for data 50 received from the second service applications 116B. Likewise, the first service connector 210a establishes a third tunnel 122c between the user device 110 and the selected remote server 130 over the second wireless network 120b for data 50 received from the first service application 116A and the second service connector 210b establishes a fourth tunnel 122d between the user device 110 and the selected remote server 130 over the second wireless network 120b for data 50 received from the second service applications 116B.

Thus, in this example, the tunnels 122 between the user device 110 and the selected remote server 130 over the first wireless network 120a include a first tunnel 122a supporting data 50 of a first service (e.g., an Internet service) communicated by the first service application 116A and a second tunnel 122b supporting data 50 of a second service (e.g., a tethering service) communicated by a second service application 116B. Similarly, the tunnels 122 between the user device 110 and the selected remote server 130 over the second wireless network 120b include a third tunnel 122c supporting data 50 of the first service communicated by the first service application 116A and a fourth tunnel 122d supporting data 50 of the second service communicated by the second service application 116B. In some implementations, the VCN manager 150 transmits data 50 from service applications 116 to the selected remote server 130 over the virtual network 30 by selecting the first tunnel 1222a or the second tunnel 122b between the user device 110 and the selected remote server 130 via the first wireless network 120a or the third tunnel 122c or the fourth tunnel 122d between the user device 110 and the selected remote server 130 via the second wireless network 120b based on the respective user software application 116 (e.g., which user software application 116 transmits the data 50).

The service connectors 210 abstract the physical wireless networks 120 away from user software applications 116 (i.e., the connection appears the same to the user software application 116 regardless of which tunnel 122 or physical wireless network 120 that the service connector 210 selects to transmit the data 50) while maintaining the flexibility to segregate data services. Wireless network operators 70 and/or users 10 may use data service segregation for a number of reasons that include pricing, priority, subscription levels, etc. For example, an MNO or MVNO may bill or track data 50 transmitted via tethering services separately from standard Internet data 50 even when both services ultimately end up communicating with the same destination server 60. Meanwhile, the network abstraction provided by the service connectors 210 allows the VCN manager 150 to unilaterally select which wireless network 120 to transmit data 50 over without impacting the user software applications 116 because the VCN manager 150 instead presents user software applications 116 with a single virtualized network connection. Thus, there is no strict correlation between the services that virtual network 30 provides versus the underlying physical wireless networks 120. That is to say, the VCN manager 150 may use a single tunnel 122 to tunnel all of the services or break each individual service to different independent tunnels 122. Put another way, a tunnel 122 may expose, re-map, or hide services from virtual endpoints. When connected to a 5G wireless network 120 and when 5G slicing is in effect, the VCN manager 150 may treat each slice as an underlying service and may re-map exposed services as appropriate.

In some implementations, the VCN manager 150 provides only the virtual network 30 to the user 10 and the user software applications 116 such that the user 10 and/or user software applications 116 have no visibility or control over the physical carrier wireless networks 120 and instead interface only with a connection to the virtual network 30. Thus, the VCN manager 150 provides the user 10 and/or user software applications 116 with a consistent network connection that provides continuous and reliable connectivity regardless of the underlying wireless networks 120 used, and the VCN manager 150 treats the physical wireless networks 120 as implementation details and secures data 50 transmitted over the wireless networks 120.

Because each service connector 210 may establish multiple tunnels 122, with each tunnel 122 supporting distinct capabilities, entities such as MVNOs may configure their networks as flexibly as possible. For example, MNO-bound services may continue to work as normal while the service connectors 210 exclusively tunnel MVNO-bound services.

In some implementations, the VCN manager 150 restricts or otherwise blocks certain user software applications 116 from accessing certain physical wireless networks 120 or service connectors 210. That is, the VCN manager 150 may impose access restrictions on some or all user software applications 116 executing on the user device 110. For example, the VCN manager 150 may restrict high-level user software applications 116 (e.g., email applications) from all service connectors 210 except for the service connector 210 that supports Internet capability. That is, the VCN manager 150 may restrict the email application from accessing, for example, the service connector 210 that supports tethering. In yet another example, the VCN manager 150 may restrict carrier applications 160 (i.e., applications associated with a specific wireless network operator 70) from accessing the wireless networks 120 of other carriers. That is, the service connectors 210 may aggregate connections to only wireless networks 120 operated by the same carrier 70 and prohibit service applications (i.e., carrier applications) 116 from accessing other carrier wireless networks 120 when the user device 110 is connected to wireless networks 120 from more than one wireless network operator 70. Optionally, the VCN manager 150 restricts user software applications 116 from access or visibility of location-sensitive wireless networks 120 (e.g., carrier Wi-Fi networks) unless the user software application 116 provides location permission.

The VCN manager 150, in some implementations, determines the wireless network operator 70 associated with each wireless network 120 connected to the user device 110. In some examples, the VCN manager 150 determines whether the first wireless network 120a is associated with a same network operator 70 as the second wireless network 120b. For example, the VCN manager 150 may query one or more carrier applications 116 installed and/or executing on the user device 110. The carrier applications 116 may each be associated with a particular carrier/wireless network operator 70, e.g., a MNO or a MVNO. The wireless network operator 70 may digitally sign the carrier application 116 and the VCN manager 150 may verify the digital signature via cryptographic keys stored or associated with a SIM 118 of the user device 110.

The VCN manager 150 may classify each user software application 116 and determine access restrictions based on the classification. For example, the VCN manager 150 may classify applications 116 as platform (i.e., OS) applications, system applications, carrier applications, and user applications. The VCN manager 150 may control what wireless networks 120 and service connectors 210 are visible and/or accessible based on the classification of the user software application 116.

In some examples, the VCN manager 150 managers the virtual networks 30 across multiple profiles defined by one or more SIMs 118 of the user device 110. For example, some users 10 may include both a work profile and a personal profile on a user device 110. These profiles may subscribe to the same or different wireless network operators 70. The VCN manager 150 may adjust which wireless networks 120 are included in the virtual network 30, preferred wireless networks, etc., based on the currently active profile(s).

Figure 3:
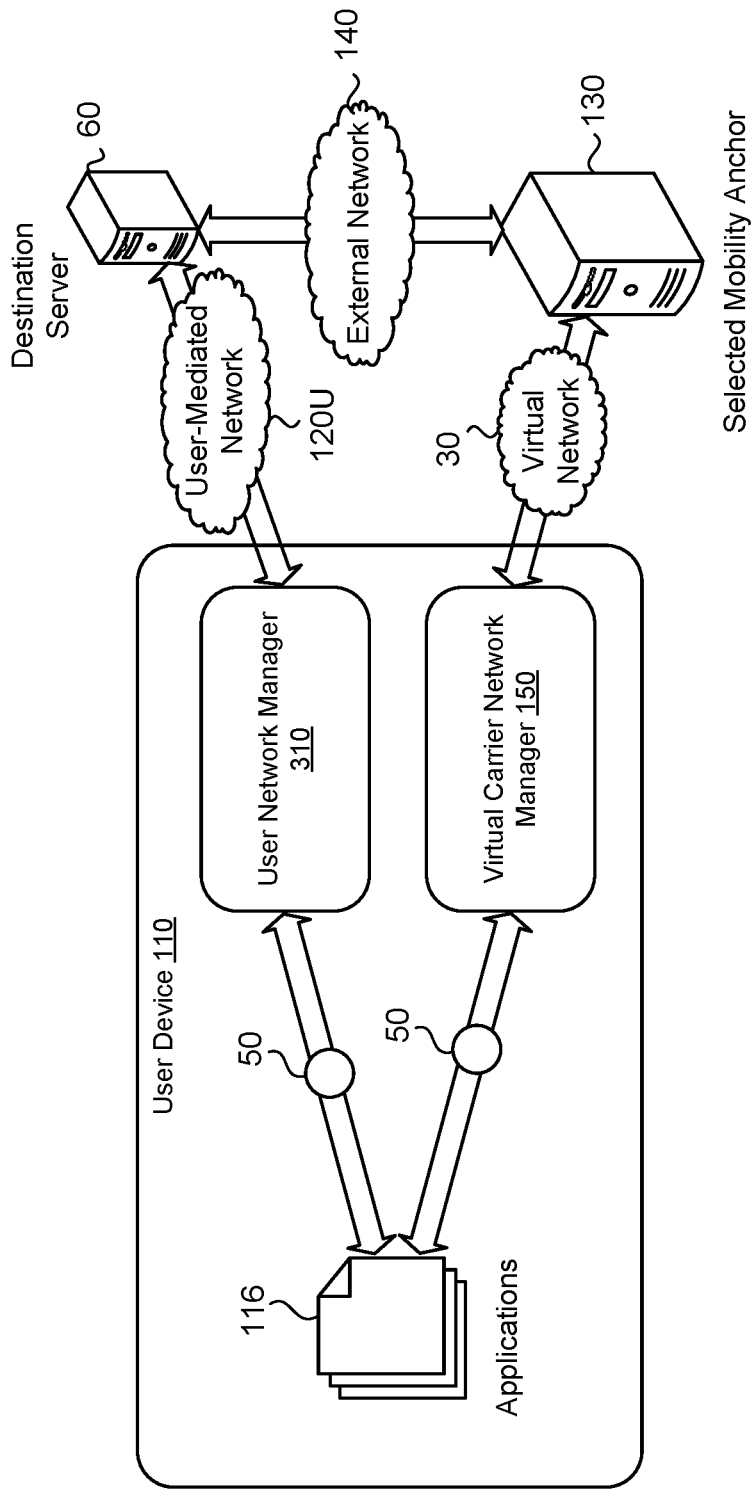
FIG. 3 is a schematic view of a virtual carrier network manager and a user network manager.

Referring now to FIG. 3, in some implementations, the user device 110 connects to a user-mediated network 120, 120U such as a home Wi-Fi network. Here, the user device 110 executes a user network manager 310 in addition to the VCN manager 150. In this example, the user software applications 116 (and/or the user 10 and/or the OS 111) select to communicate with the destination server 60 either through the virtual network 30 via the VCN manager 150 (i.e., one of the carrier wireless networks 120) or via the user-mediated network 120U through the user network manager 310. That is, in some examples, user-mediated networks 120U are independent of the VCN manager 150 and the virtual network 30. The user network manager 310 transmits data packets 50 from the user device 110 to the destination server 60 via the user-mediated network 120U (and likely through an additional external network) to the destination server 60 and bypasses the VCN manager 150, the virtual network 30, and the selected remote server 130. Thus, data 50 that traverses user-mediated networks 120U is not received by the remote server 130 which alleviates privacy and consent concerns.

Figure 4A:
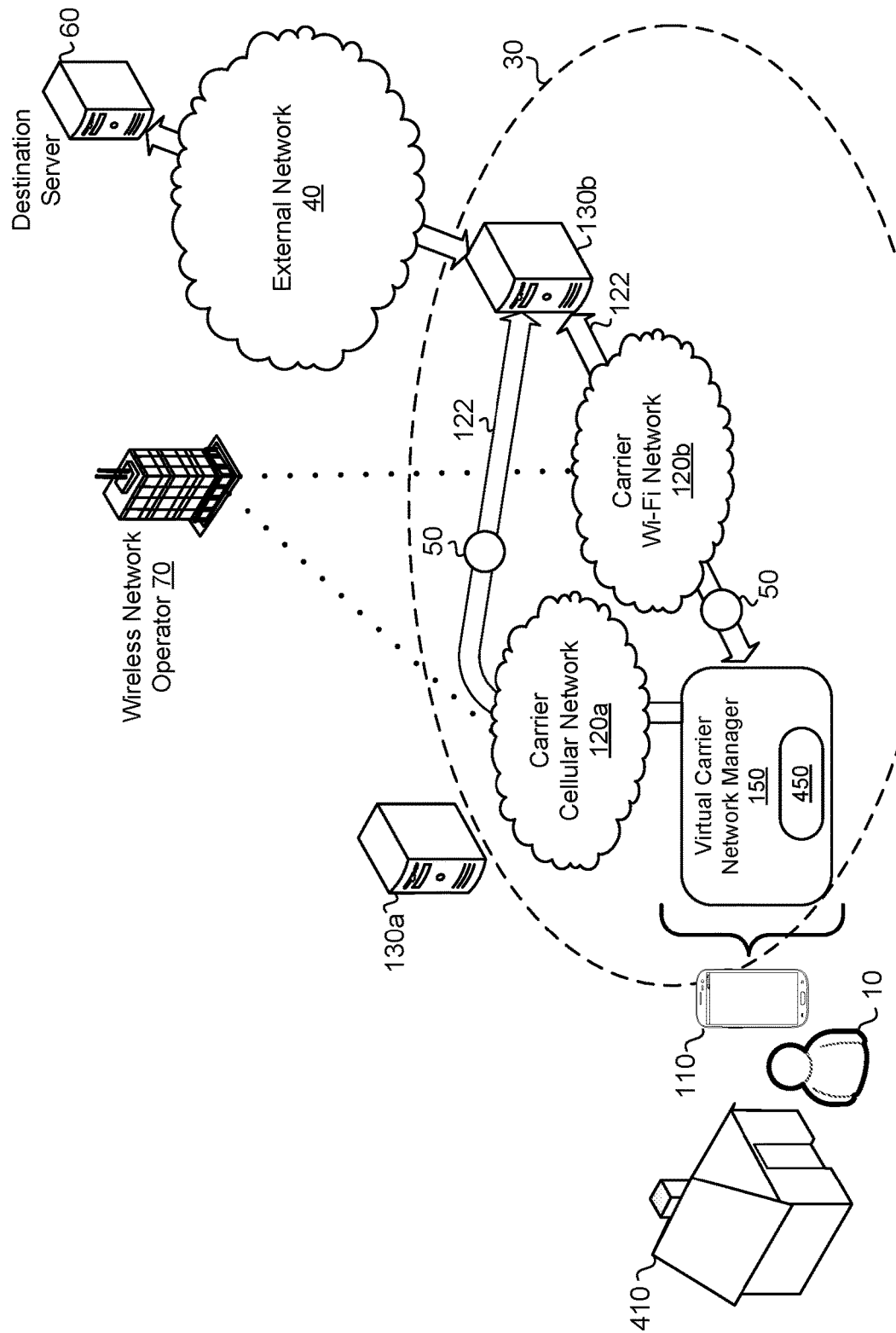
FIGS. 4A and 4B are schematic views of a virtual carrier network manager switching mobility anchors.

Referring now to FIG. 4A, in some implementations, the VCN manager 150 selects the remote server 130 based on the different geographical location of each of the plurality of remote servers 130. In the example shown, the user device 110 is located at a residence 410 of the user 10 and is within range of the carrier Wi-Fi network 120b. Based on a network preference 450, the VCN manager 150 selects the carrier Wi-Fi network 120b as the preferred wireless network 120 over the carrier cellular network 120a. The network preference 450 may include factors such as cost, reliability, latency, congestion, bandwidth, location, transport type, domain name system (DNS) privacy, cellular radio access technology (RAT), signal strength, current active link, unreliability of link, movement or speed of the user device 110, etc. For example, when in range, carrier Wi-Fi networks 120b tend to be cheaper and more reliable than carrier cellular networks 120a, and therefore carrier Wi-Fi networks 120b are sometimes preferred over carrier cellular networks 120a when available. The VCN manager 150 may receive network statistics for one or more of the connected wireless networks 120 that affect the network preference 450. The wireless network operator 70 may dictate a portion of the network preference 450 (e.g., via an user software application 116 or the SIM 118).

The VCN manager 150 may select the remote server 130 based on the selected preferred wireless network and/or the geographical location of the remote server 130. Continuing with the example of FIG. 4A, the geographical location of the remote server 130b is at or near the data center of the carrier Wi-Fi network 120b and the geographical location of the remote server 130a is at or near a different data center of the carrier cellular network 120a. With the user device 110 primarily transmitting data 50 over the carrier Wi-Fi network 120b, as opposed to the carrier cellular network 120a (e.g., due to the geographical location of the user device 110, the preferred wireless network 120, the network preference 450, etc.), the VCN manager 150 selects the remote server 130b due to the vicinity of the remote server 130b to the carrier Wi-Fi network data center which provides a generally reduced latency for the data 50 versus, for example, the remote server 130a due to the shorter distance the data 50 must travel.

After selecting the remote server 130b, the VCN manager 150 establishes the virtual network 30 via tunnels 122 between the user device 110 and the selected remote server 130b over both the carrier cellular network 120a and the carrier Wi-Fi network 120b. The user software applications 116 transmit data 50 via the tunnels 122 to the selected remote server 130b, which in turn routes the data 50 through the external network 40 to the destination server 60.

Figure 4B:
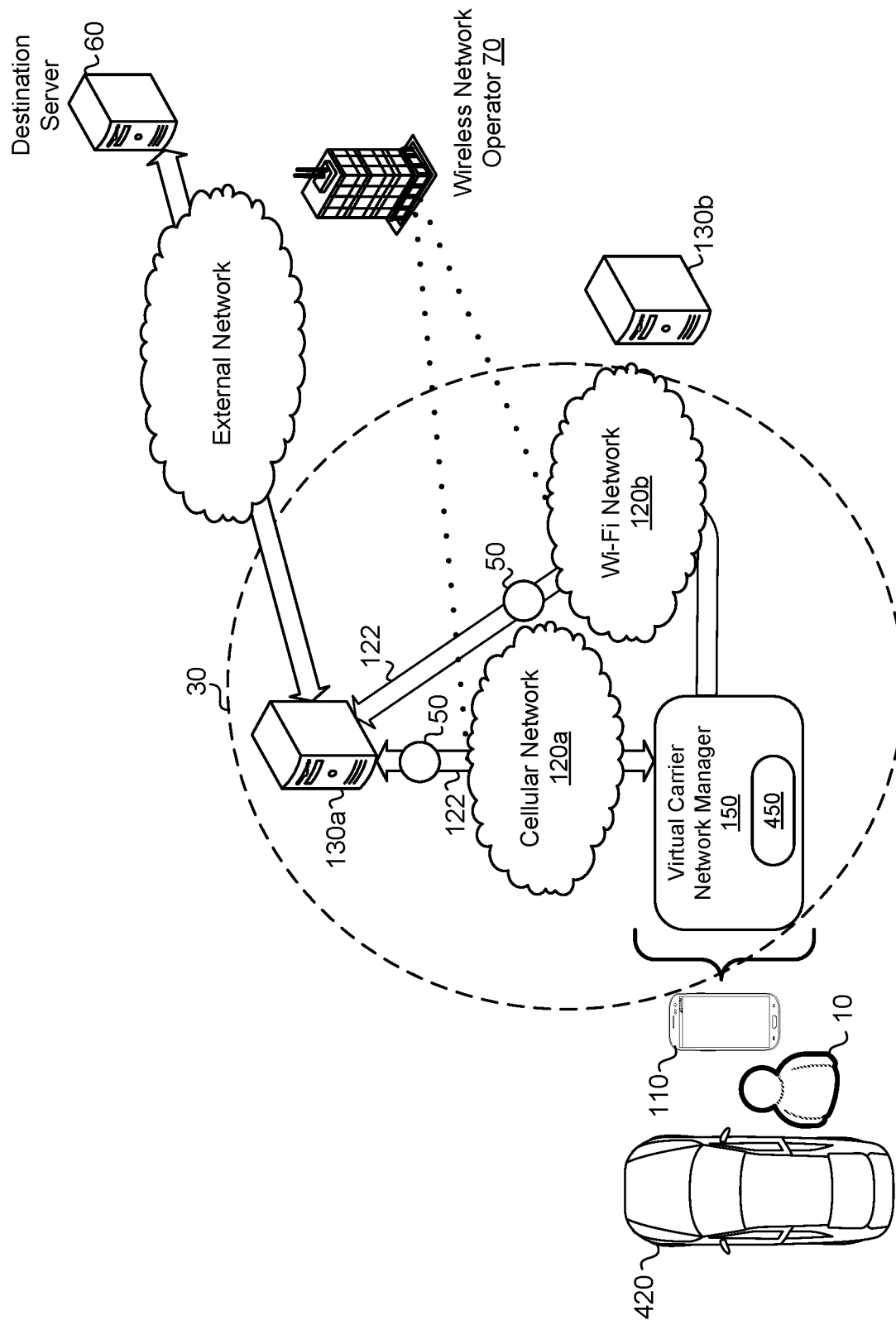

Referring now to FIG. 4B, in this example, the user 10 is travelling via a vehicle 420. Here, the VCN manager 150 may select a second one of a plurality of remote servers 130 based on the different geographical location of each of the plurality of remote servers 130. For example, due to the movement of the user device 110 within the vehicle 420, the carrier Wi-Fi network 120b is no longer a viable preferred wireless network 120 and the carrier cellular network 120a becomes the preferred wireless network 120. In some examples, this causes the VCN manager 150 to select a new "mobility anchor" (i.e., a remote server 130) that is better suited to the new preferred wireless network 120. Here, because the remote server 130a is geographically located at or near the data center for the carrier cellular network 120a, the VCN manager 150 selects the remote server 130a over the remote server 130b.

In some implementations, the VCN manager 150 establishes a second virtual network 30 via tunnels 122 between the user device 110 and the selected remote server 130a over the carrier cellular network 120a and the carrier Wi-Fi network 120b. The user software applications 116 transmit data 50 via the tunnels 122 to the selected remote server 130a, which in turn routes the data 50 through the external network 40 to the destination server 60.

The VCN manager 150 may select different remote servers 130 (i.e., mobility anchors) for a number of other reasons. For example, when a remote server requires maintenance or suffers a failure, the VCN manager 150 may select a different remote server 130. The VCN manager 150 may select a different remote server 130 based on bit miles, latency, and throughput concerns. The VCN manager 150 may maintain a first virtual network 30 with a previously selected remote server 130 after establishing a second virtual network 30 with a newly selected remote server 130 (i.e., maintain two separate virtual networks 30) to maintain mobility for a period of time prior to terminating the first virtual network 30. That is, mobility anchors may deprecate for a period of time prior to termination. The VCN manager 150 may select the remote server 130 (i.e., the mobility anchor) based on services supported by the remote server 130. That is, not all remote servers 130 may support all services. Some geographical locations may include multiple remote servers 130 and each remote server 130 may support a different set of services with some or no overlap. Thus, the VCN manager 150 may select remote servers 130 even with the same geographical location for certain services or for other purposes such as load balancing, maintenance, etc.

Thus, the VCN manager 150 provides a single, unified network abstraction on top of one or more physical wireless networks 120 and migrates network connectivity between the physical wireless networks 120 for users 10 and user software applications 116. The VCN manager 150 virtualizes each data service provided by the user device 110 (e.g., Internet, MMS, tethering, VoIP, etc.) simultaneously and maps each service appropriately to the physical carrier wireless networks 120 connected to the user device 110. This allows the VCN manager 150 to fully emulate a cellular network connection to both users 10 and user software applications 116. The VCN manager 150 may handoff between different mobility anchors (i.e., remote servers 130) to provide an MNO or MVNO the ability to load-balance, perform maintenance, and for geographic optimization. The VCN manager 150 minimizes performance overhead versus a conventional virtualization layer while also allowing wireless network operators 70 to improve network reliability by switching to different mobility anchors during network or infrastructural changes. While examples herein commonly show the user device 110 communicating with a first wireless network 120a and a second wireless network 120b, the user device 110 and VCN manager 150 may connect and manage any number of carrier wireless networks 120.

Figure 5:
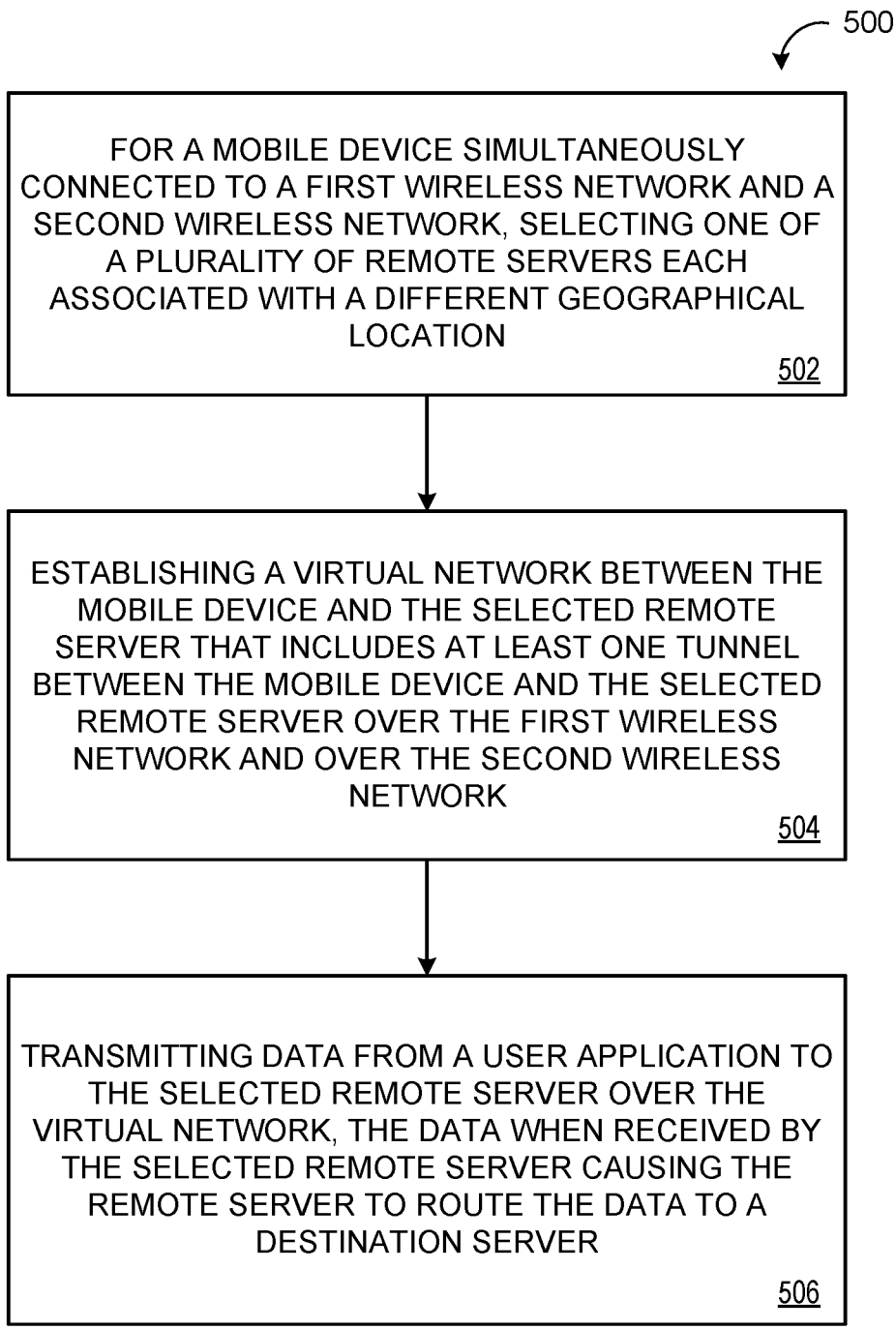
FIG. 5 is a flowchart of an example arrangement of operations for a method of providing a virtual carrier network for a mobile device.

FIG. 5 is a flowchart of an exemplary arrangement of operations for a method 500 of establishing a virtual carrier network with a mobile device 110. The method 500, at operation 502, includes, for the mobile device 110 executing a user software application 116 and simultaneously connected to a first wireless network 120a associated with a mobile virtual network operator (MVNO) and a second wireless network 120b associated with the same MVNO, selecting, by data processing hardware 112, one of a plurality of remote servers 130. Each remote server 130 of the plurality of remote servers 130 is associated with a different geographical location.

The method 500, at operation 504, includes establishing, by the data processing hardware 112, a virtual network 30 between the mobile device 110 and the selected remote server 130. The virtual network 30 includes at least one tunnel 122 between the mobile device 110 and the selected remote server 130 over the first wireless network 120a and at least one tunnel 122 between the mobile device 110 and the selected remote server 130 over the second wireless network 120b.

At operation 506, the method 500 includes transmitting, by the data processing hardware 112, data 50 from the user software application 116 to the selected remote server 130 over the virtual network 30 via one of the at least one tunnel 122 between the mobile device 110 and the selected remote server 130 over the first wireless network 120a or via one of the at least one tunnel 122 between the mobile device 110 and the selected remote server 130 over the second wireless network 120b. The data 50 when received by the selected remote server 130 causes the selected remote server 130 to route the data 50 to a destination server 60.

Figure 6:
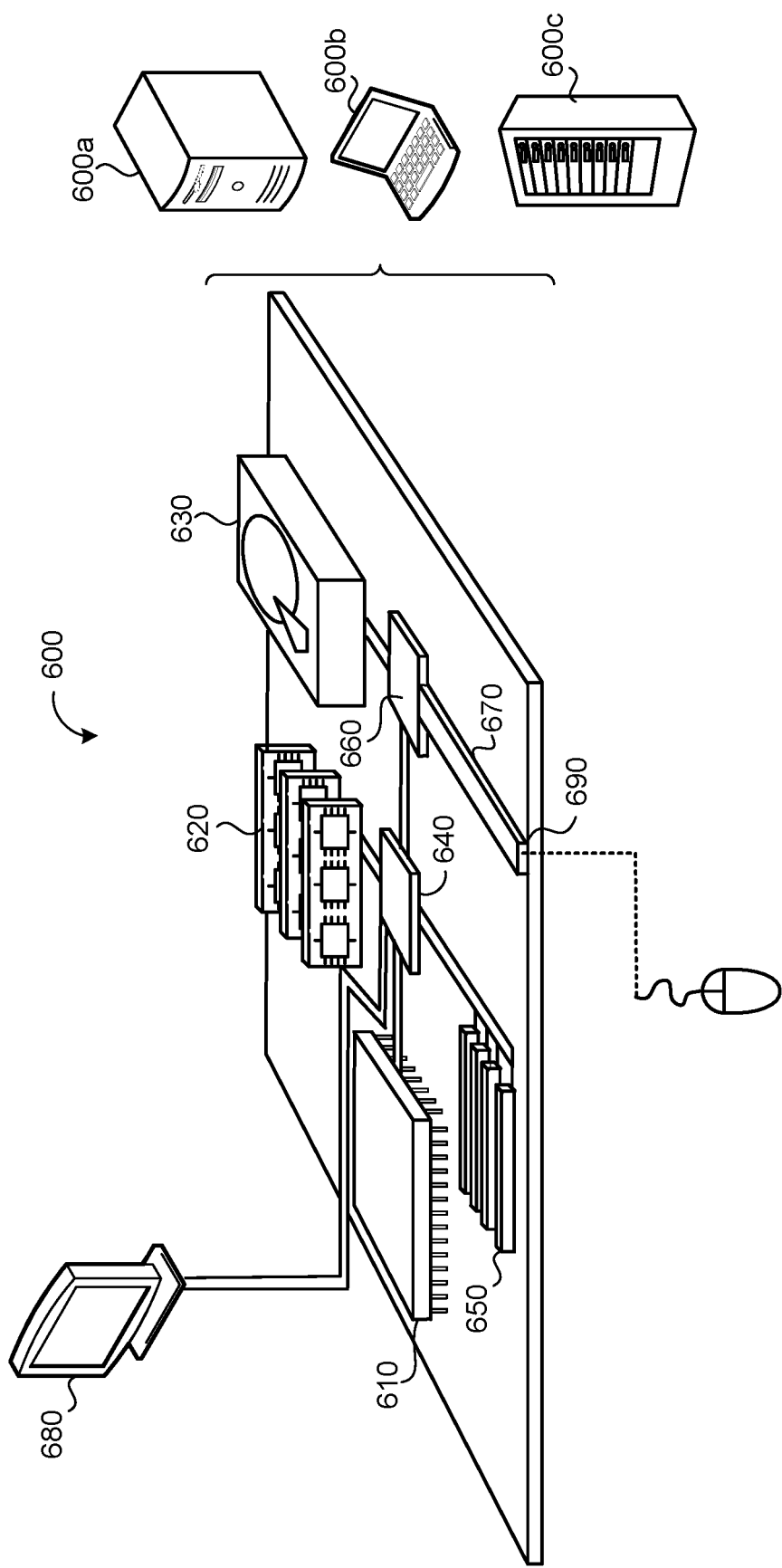
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
    selecting, by data processing hardware of a mobile device executing a user application, one of a first wireless network associated with a mobile virtual network operator (MVNO) and a second wireless network associated with the same MVNO;
    selecting, by the data processing hardware, a remote server from a plurality of remote servers based on the one of the first wireless network and the second wireless network, both of which are associated with the same MVNO, each remote server of the plurality of remote servers associated with a geographical location;
    establishing, by the data processing hardware, a virtual network between the mobile device and the selected remote server, the virtual network comprising at least one tunnel between the mobile device and the selected remote server over the one of the first wireless network and the second wireless network; and
    transmitting, by the data processing hardware, data from the user application to the selected remote server over the virtual network via one of the at least one tunnel between the mobile device and the selected remote server over the one of the first wireless network and the second wireless network, the data when received by the selected remote server causing the selected remote server to route the data to a destination server.

2. The method of claim 1, wherein:
    the at least one tunnel between the mobile device and the selected remote server over the first wireless network comprises a first tunnel supporting data of a first service and a second tunnel supporting data of a second service;
    the at least one tunnel between the mobile device and the selected remote server over the second wireless network comprises a third tunnel supporting data of the first service and a fourth tunnel supporting data of the second service; and
    transmitting data from the user application to the selected remote server over the virtual network comprises selecting the first tunnel or the second tunnel between the mobile device and the selected remote server via the first wireless network or the third tunnel or the fourth tunnel between the mobile device and the selected remote server via the second wireless network based on the user application.

3. The method of claim 1, wherein the first service comprises an Internet service and the second service comprises a tethering service.

4. The method of claim 1, further comprising, after transmitting the data from the user application to the selected remote server:
    connecting, by the data processing hardware, the mobile device to a third wireless network, the third wireless network comprising a user Wireless Fidelity (Wi-Fi) network; and
    transmitting, by the data processing hardware, data from the user application to the destination server over the third wireless network.

5. The method of claim 1, wherein selecting the remote server from the plurality of remote servers is based on the geographical location of each remote server of the plurality of remote servers.

6. The method of claim 5, further comprising, prior to selecting the remote server from the plurality of remote servers:
    selecting, by the data processing hardware, a preferred wireless network from the first wireless network or the second wireless network based on a network preference,
    wherein selecting the remote server from the plurality of remote servers is based on the selected preferred wireless network.

7. The method of claim 6, further comprising, after selecting the preferred wireless network:
    selecting, by the data processing hardware, a second remote server from the plurality of remote servers based on the geographical location of each remote server of the plurality of remote servers;
    establishing, by the data processing hardware, a second virtual network between the mobile device and the selected second remote server; and
    transmitting, by the data processing hardware, data from the user application to the selected second remote server over the second virtual network, the data when received by the selected second remote server causing the selected second remote server to route the data to the destination server.

8. The method of claim 1, wherein the user application comprises a virtual private network (VPN) application and wherein the destination server comprises a VPN server associated with the VPN application.

9. The method of claim 1, further comprising, determining, by the data processing hardware, whether the first wireless network is associated with the same MVNO as the second wireless network.

10. The method of claim 1, wherein the first wireless network comprises a cellular network and the second wireless network comprises a Wireless Fidelity (Wi-Fi) network.

11. A system comprising:
data processing hardware of a mobile device; and
memory hardware in communication with the data processing hardware, the memory hardware storing instructions that when executed on the data processing hardware cause the data processing hardware to perform operations comprising:
selecting, for the mobile device executing a user application, one of a first wireless network associated with a mobile virtual network operator (MVNO) and a second wireless network associated with the same MVNO;
selecting a remote server from a plurality of remote servers based on the one of the first wireless network and the second wireless network, both of which are associated with the same MVNO, each remote server of the plurality of remote servers associated with a geographical location;
establishing a virtual network between the mobile device and the selected remote server, the virtual network comprising at least one tunnel between the mobile device and the selected remote server over the one of the first wireless network and the second wireless network; and
transmitting data from the user application to the selected remote server over the virtual network via one of the at least one tunnel between the mobile device and the selected remote server over the one of the first wireless network and the second wireless network, the data when received by the selected remote server causing the selected remote server to route the data to a destination server.

12. The system of claim 11, wherein:
the at least one tunnel between the mobile device and the selected remote server over the first wireless network comprises a first tunnel supporting data of a first service and a second tunnel supporting data of a second service;
the at least one tunnel between the mobile device and the selected remote server over the second wireless network comprises a third tunnel supporting data of the first service and a fourth tunnel supporting data of the second service; and
transmitting data from the user application to the selected remote server over the virtual network comprises selecting the first tunnel or the second tunnel between the mobile device and the selected remote server via the first wireless network or the third tunnel or the fourth tunnel between the mobile device and the selected remote server via the second wireless network based on the user application.

13. The system of claim 11, wherein the first service comprises an Internet service and the second service comprises a tethering service.

14. The system of claim 11, wherein the operations further comprise, after transmitting the data from the user application to the selected remote server:
connecting the mobile device to a third wireless network, the third wireless network comprising a user Wireless Fidelity (Wi-Fi) network; and
transmitting data from the user application to the destination server over the third wireless network.

15. The system of claim 11, wherein selecting the remote server from the plurality of remote servers is based on the geographical location of each remote server of the plurality of remote servers.

16. The system of claim 15, wherein the operations further comprise, prior to selecting the remote server from the plurality of remote servers:
selecting a preferred wireless network from the first wireless network or the second wireless network based on a network preference,
wherein selecting the remote server from the plurality of remote servers is based on the selected preferred wireless network.

17. The system of claim 16, wherein the operations further comprise, after selecting the preferred wireless network:
selecting a second remote server from the plurality of remote servers based on the geographical location of each remote server of the plurality of remote servers;
establishing a second virtual network between the mobile device and the selected second remote server; and
transmitting data from the user application to the selected second remote server over the second virtual network, the data when received by the selected second remote server causing the selected second remote server to route the data to the destination server.

18. The system of claim 11, wherein the user application comprises a virtual private network (VPN) application and wherein the destination server comprises a VPN server associated with the VPN application.

19. The system of claim 11, wherein the operations further comprise, determining whether the first wireless network is associated with the same MVNO as the second wireless network.

20. The system of claim 11, wherein the first wireless network comprises a cellular network and the second wireless network comprises a Wireless Fidelity (Wi-Fi) network.

* * * * *